(12) United States Patent
Fan

(10) Patent No.: US 7,784,808 B2
(45) Date of Patent: Aug. 31, 2010

(54) REAR-PEDALING STANDING TYPE BICYCLE STRUCTURE

(75) Inventor: Jeeng-Neng Fan, Taoyuan (TW)

(73) Assignee: Hsin Lung Accessories Co., Ltd., Hsin Chu Hsien (TW)

( * ) Notice: Subject to any disclaimer, the term of this patent is extended or adjusted under 35 U.S.C. 154(b) by 250 days.

(21) Appl. No.: 12/149,545

(22) Filed: May 5, 2008

(65) Prior Publication Data
US 2009/0273155 A1 Nov. 5, 2009

(51) Int. Cl.
*B62M 1/04* (2006.01)
(52) U.S. Cl. .................... 280/221; 280/256
(58) Field of Classification Search .............. 280/221, 280/253, 256, 257
See application file for complete search history.

(56) References Cited

U.S. PATENT DOCUMENTS

| | | | | |
|---|---|---|---|---|
| 5,368,321 A | * | 11/1994 | Berman et al. | 280/221 |
| 6,659,486 B2 | * | 12/2003 | Eschenbach | 280/221 |
| 6,773,022 B2 | * | 8/2004 | Janssen | 280/221 |
| 6,857,648 B2 | * | 2/2005 | Mehmet | 280/217 |
| 2002/0093171 A1 | * | 7/2002 | Chen | 280/253 |
| 2004/0222612 A1 | * | 11/2004 | Hung | 280/253 |
| 2005/0248117 A1 | * | 11/2005 | Hung | 280/221 |
| 2010/0001487 A1 | * | 1/2010 | Pang | 280/221 |

* cited by examiner

*Primary Examiner*—Kevin Hurley
(74) *Attorney, Agent, or Firm*—Rosenberg, Klein & Lee

(57) ABSTRACT

The present invention discloses a rear-pedaling standing type bicycle structure having a driving means installed at a front end of a bicycle frame and proximate to a corresponding line of front and rear wheels, and pedals pivotally coupled to both lateral sides of the front end of the bicycle frame for up and down movements. The driving means can be driven up and down alternately by the left and right pedals, and a link wheel is provided for transmitting kinetic forces to the rear wheel to drive the bicycle, so that the bicycle can be operated and driven in a special unique way to achieve the effects of expanding the exercising range and giving more fun to the exercise and game.

6 Claims, 5 Drawing Sheets

REAR-PEDALING STANDING TYPE BICYCLE STRUCTURE

BACKGROUND OF THE INVENTION

1. Field of the Invention

The present invention relates to a rear-pedaling standing type bicycle structure, more particularly to a rear-pedaling standing type bicycle structure that provides a simple, easy, convenient and unique way of operating a bicycle to achieve the effects of expanding the exercising range and giving more fun to the exercise and game.

2. Description of the Related Art

In general, a bicycle is driven to move forward by pedaling on a pair of pedals installed with an included angle of 180 degrees for a circumferential movement, and wheels of the bicycle are driven by related transmission components (including a crankset, a chain and a flywheel, etc), and the wheels keep rotating to drive the bicycle body forward. Further, a general bicycle has a seat cushion provided for a bicycle rider to sit, so that the body weight of the rider is supported by the seat cushion to allow both legs to apply a sufficient force for a smooth and safe circumferential movement of the pedals. Although the traditional bicycles can achieve the transportation purpose, the rider's upper body movement is limited by the rider's sitting on the seat cushion, and the exercise effect is not as expected, and the fun of riding the bicycle is not as good. Traditional bicycles no longer provide a good motive for riders to ride the bicycles.

SUMMARY OF THE INVENTION

Therefore, it is a primary objective of the present invention to provide a rear-pedaling standing type bicycle structure, wherein a driving means is installed at a front end of a bicycle frame proximate to a corresponding line of the front and rear wheels, and pedals are pivotally coupled to both lateral sides of the front end of the bicycle frame and moved up and down, such that when the left and right pedals are moved up and down alternately, a crankset of the driving means is rotated in an opposite direction, and the kinetic force of a link wheel is transmitted to a rear wheel to move the bicycle forward, and the rider can pedal by both legs while standing. The operation of the bicycle not only achieves the effect of expanding the exercise range, but also provides a unique way of operating and riding the bicycle to achieve the transportation purpose as well as the fun of riding a bicycle.

Another objective of the present invention is to provide a rear-pedaling standing type bicycle structure, wherein a crankset of the driving means is installed on a corresponding line of the front and rear wheels and the left and right pedals for driving the crankset are disposed equidistantly from each other and on both lateral sides, and the distance between the left and right pedals can be reduced substantially, and a force applying point for a rider's left and right legs to pedal can be situated evenly on both lateral sides of the corresponding line of the front and rear wheels. As to the standing rider who steps on the pedals, the pedal movement can be very smooth, convenient, natural and comfortable, and the center of gravity can be maintained on the corresponding line of the front and rear wheels to achieve the stable, deviation free and safe riding effects.

To make it easier for our examiner to understand the objects, characteristics and effects of the present invention, we use preferred embodiments accompanied with related drawings for the detailed description of the present invention as follows:

DETAILED DESCRIPTION OF THE PREFERRED EMBODIMENTS

Figure 1:
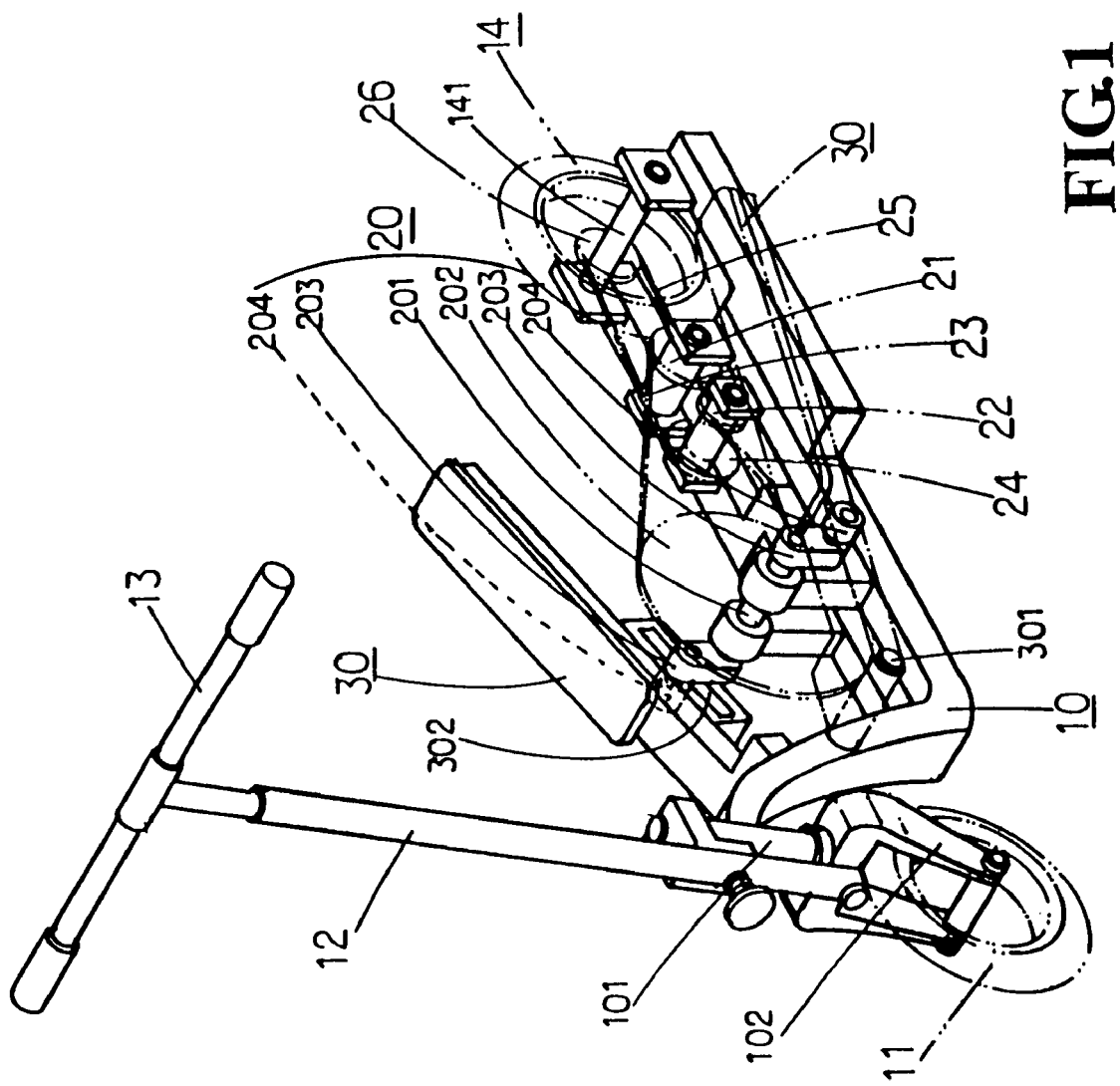
FIG. 1 is a perspective view of a preferred embodiment of the present invention.
Figure 2:
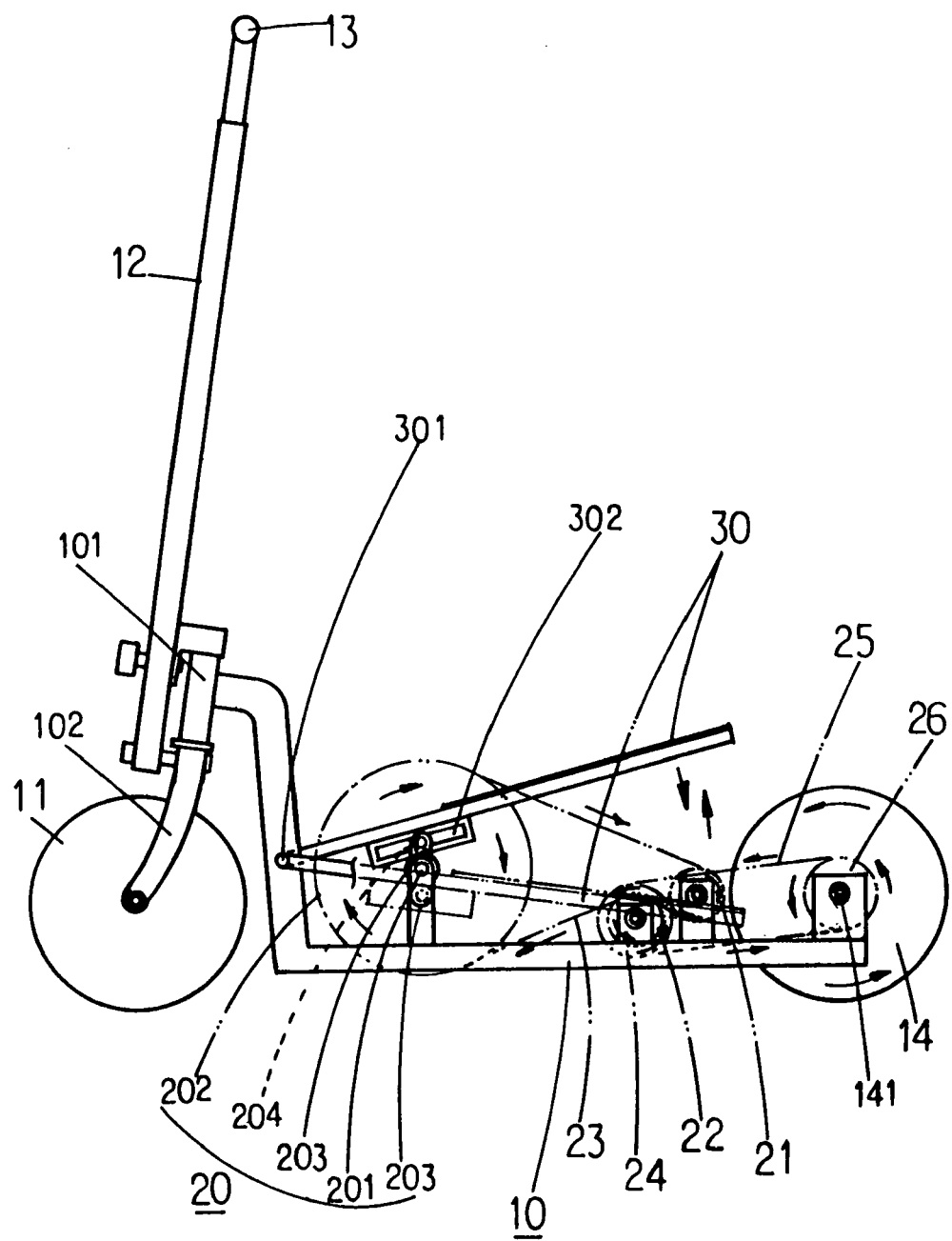
FIG. 2 is a front view of FIG. 1.
Figure 3:
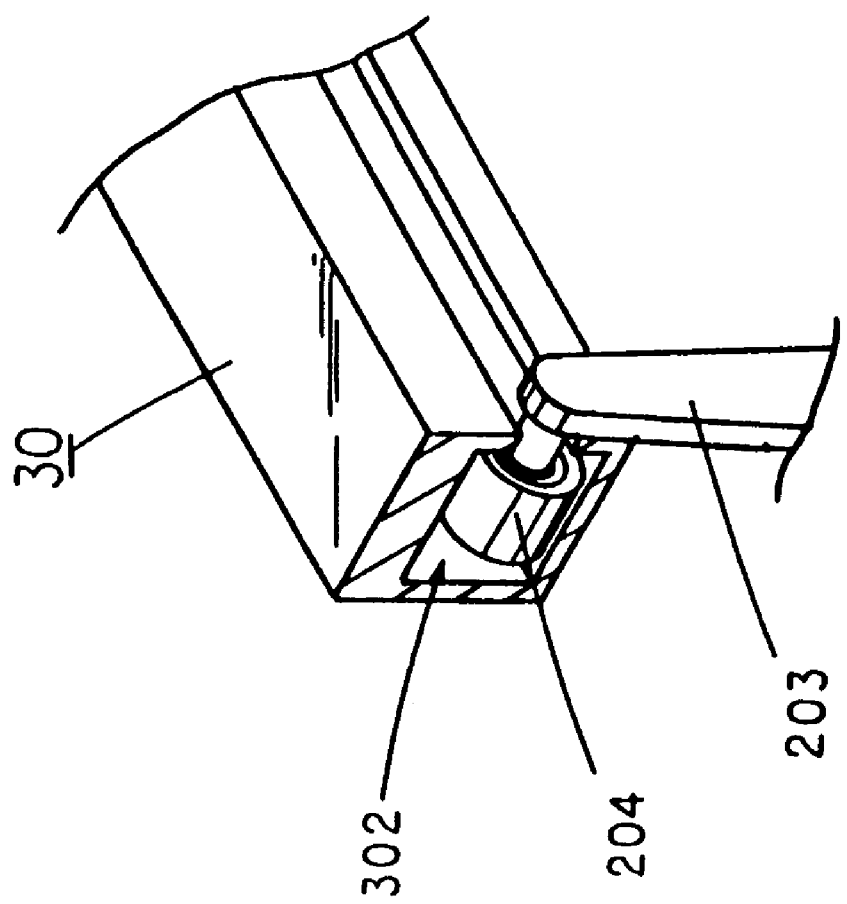
FIG. 3 is a schematic view of a pedal installed with a crank and a driving member.

Referring to FIGS. 1 to 3 for a rear-pedaling standing type bicycle structure of the present invention, a front wheel 11, a vertical tube 12 and a handle 13 are installed at the front of a bicycle frame 10 through a front tube 101 and a front fork 102, and a rear wheel 14 is installed at the rear end of the bicycle frame 10 through an axle 141, and a shaft 201 is installed at a position proximate to the front end of the bicycle frame 10, a crankset 202 is installed at the shaft 201, a crank 203 is installed with an included angle of 180 degrees and disposed on both ends of the shaft 201, a driving means 20 pivotally connected to a transmission module at an end of a driving member 204 away from the crank crane 203 of the shaft 201, and pedals 30 are pivotally connected on both lateral sides of the front end of the bicycle frame 10. The crankset 202 of the driving means 20 is situated on a corresponding line of the front and rear wheels 11, 14. The left and right pedals 30 are disposed equidistantly on both lateral sides of the corresponding line of front and rear wheels 11, 14, and the front end is pivotally coupled to the bicycle frame 10 through a pivot 301, such that the left and right pedals 30 can move up and down at the rear end. The bottom of the left and right pedals 30 include a longitudinal slide passage 302 provided for embedding and sliding a driving member 204 at another end of the left and right cranks 203 (as shown in FIG. 3), so that the left and right pedals 30 can move up and down alternately for driving and rotating the driving member 204, the crank, the shaft 201 and the crankset 202 directly.

A driven gear wheel 21 is installed at a rear end of the bicycle frame 10, and a link wheel 22 is installed between the crankset 202 of the driving means 20 and the driven gear wheel 21, and a first driving chain 23 is installed between the crankset 202 and the driven gear wheel 21, such that the link wheel 22 is driven by the external side of the first driving chain 23 to rotate in an opposite direction. Further, a transmission wheel 24 is installed coaxially at another end of the link wheel 22, so that a second driving chain 25 can transmit a kinetic force to a flywheel 26 of a rear wheel axle 141.

Since the left and right pedals 30 are swung to move up and down alternately with a turning point of a pivot 301, a rider can apply a force to the driving member 204 and the crank 203 to rotate in an opposite direction when stepping on the left and right pedals 30 by both legs and while standing, such that the shaft 201 and the crankset 202 are driven to rotate in opposite directions. In other words, the crankset is rotated in a direction opposite to that of a general bicycle. The external side of the first driving chain 23 installed around and between the crankset 202 and the driven gear wheel 21 is provided for driving the link wheel 22 (which is installed below the first driving chain 23 as shown in FIG. 1), and the link wheel 22 is driven to rotate clockwise directly, such that the coaxial transmission wheel 24 can be rotated clockwise through the rear wheel axle 141 driven by the second driving chain 25, and the rear wheel axle 141 together with the rear wheel 14 can be rotated clockwise to drive the bicycle body forward.

Figure 4:
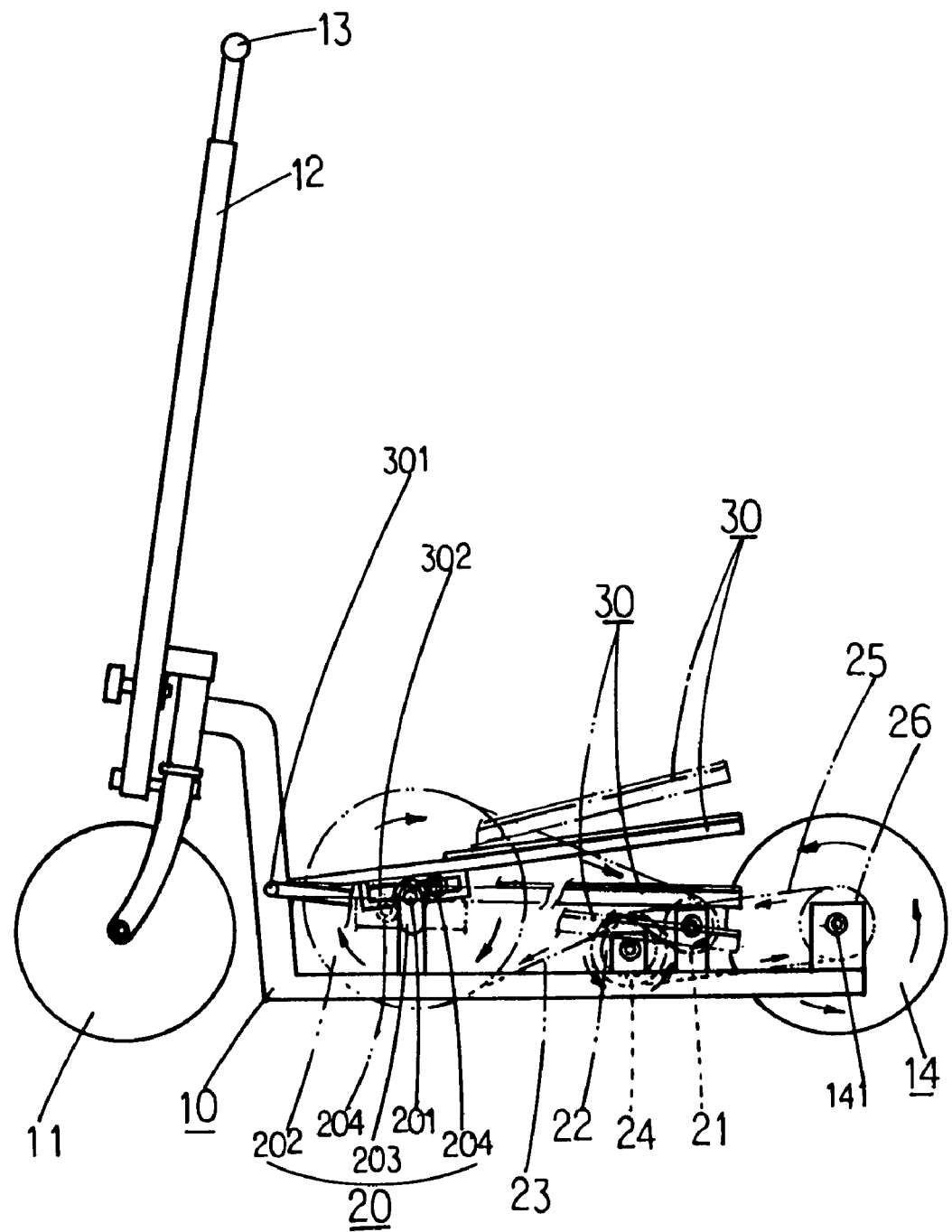
FIG. 4 is a schematic view of pedaling the pedal of FIG. 2.

With the structure of the invention as shown in FIG. 4, a rider can hold the handle 13 by both hands and step on the left and right pedals 30 by both legs while standing. The left and right pedals 30 are swung to move up and down by using a pivot 301 at the front end as a turning point, and the driving means 20 corresponds to an included angle of 180 degrees, and a driving member 204 is installed at an end of the crank 203 away from the shaft 201 and slid precisely in a longitudinal slide passage 302 disposed at the bottom of the left and right pedals 30. When a bicycle rider pedals the pedals 30, a force is applied directly to the driving member 204 to drive the crankset 202 on the shaft 201 to rotate in an opposite direction. In the meantime, the link wheel 22 installed between the crankset 202 and the driven gear wheel 21 is installed around and between the crankset 202 and the driven gear wheel 21 and driven by the external side of the first driving chain 23, so that the rotating direction is opposite to the rotation of the crankset 202, and the transmission wheel 24 installed coaxially with the link wheel 23 can transmit a kinetic force to the rear wheel axle 141 and the rear wheel 14 through the second chain 25 in order to rotate the rear wheel 14 clockwise at the same time to drive the bicycle body forward and achieve the bicycle traveling effect.

The rider's legs step on the left and right pedals 30 alternately while standing, so that the crankset 202 of the driving means 20 is rotated in an opposite direction to drive the rear wheel 14, and drive the bicycle body to move forward smoothly. The operation of the bicycle extends the exercising range and gives more fun to the exercise and game.

Since the crankset 202 of the driving means 20 is installed on the corresponding line of the front and rear wheels 11, 14, the left and right pedals 30 can be disposed equidistantly from both lateral sides of the corresponding line of the front and rear wheels 11, 14 to substantially reduce the distance between the left and right pedals 30 and the force applying point of the rider's left and right legs to pedal is disposed evenly on the lateral sides of the corresponding line of the front and rear wheels 11, 14. As to the standing rider, the pedaling operation made by both legs is very smooth, natural convenient and comfortable. The center of gravity can be maintained on the corresponding line of the front and rear wheels 11, 14 to give a stable, deviation free and safe riding effect.

Figure 5:
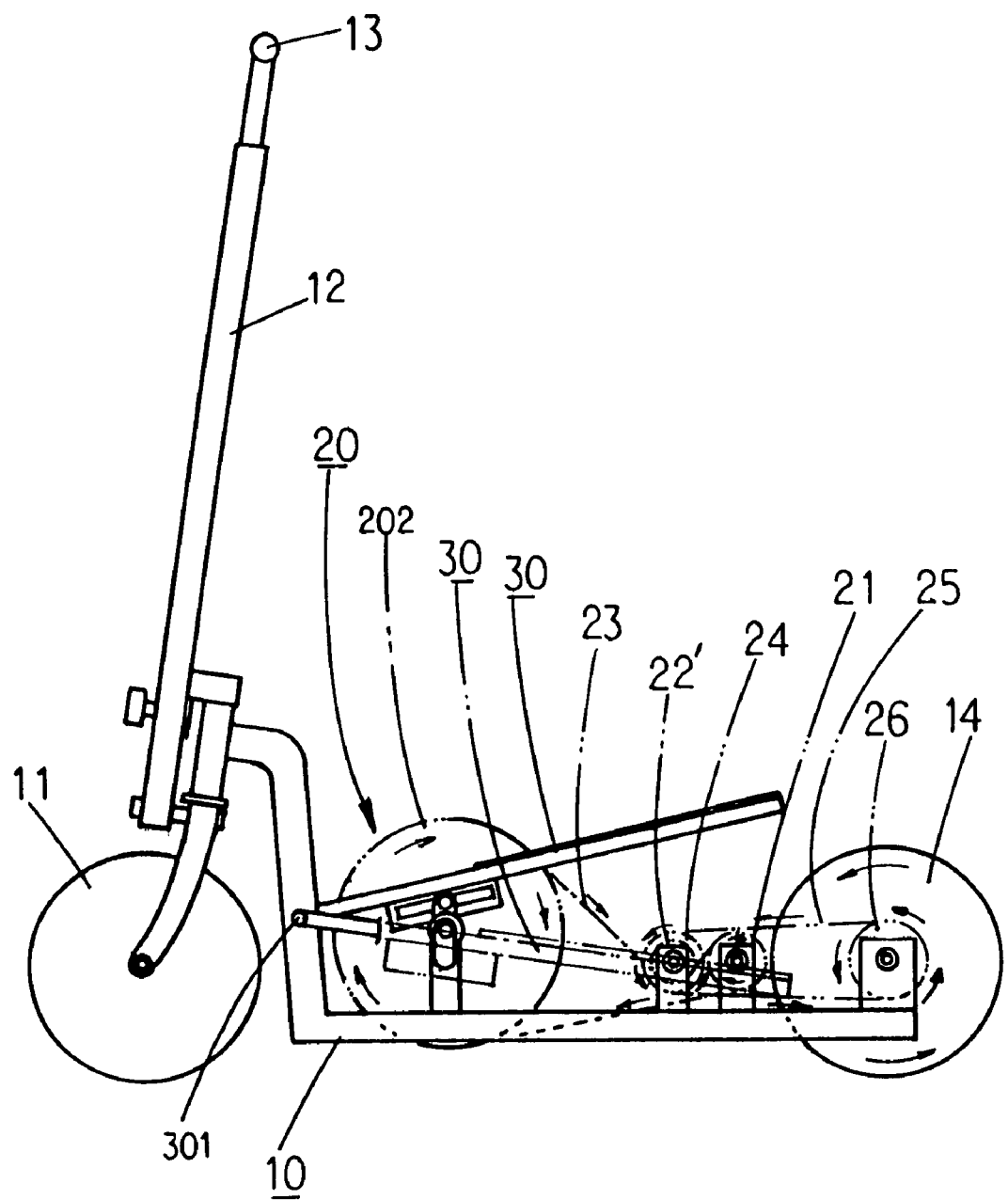
FIG. 5 is a schematic view of a link wheel installed at the top of a first driving chain.

In FIG. 5, the link wheel 22' installed between the crankset 202 and the driven gear wheel 21 can be installed above the first driving chain 23 to convert the force of driving the crankset 202 of the driving means 20 in an opposite direction into a clockwise direction. Similarly, the link wheel 22' can be driven clockwise by the external side of the first driving chain 23, and the coaxial transmission wheel 24 can transmit the clockwise rotating driving force to the rear wheel 14 to achieve the effect of driving the bicycle body smoothly.

What is claimed is:

1. A rear-pedaling standing type bicycle structure, comprising:

a front wheel, installed at the front of a bicycle frame through a front tube with a front fork, and a vertical tube with a handle;

a rear wheel, installed at the rear of the bicycle frame, and having a flywheel installed at an axle of the rear wheel;

a shaft, installed at a position proximate to the front of the bicycle frame, and having a crankset installed at the shaft, and a driving means of a transmission module installed on both ends of the shaft and with an included angle of 180 degrees;

a driven gear wheel, installed at a position proximate to the rear of the bicycle frame; and a first driving chain, installed between the driven gear wheel and the crankset of the driving means;

characterized in that pedals are pivotally coupled on both lateral sides of the front of the bicycle frame and swung up and down to drive a crank and an axle of the driving means to rotate; and the crankset of the driving means is installed on a corresponding line of the front and rear wheels, such that the left and right pedals are disposed equidistantly from both lateral sides of the corresponding line of the front and rear wheels; and a link wheel is installed between the crankset of the driving means and the driven gear wheel and driven precisely by the external side of the first driving chain; and a transmission wheel is installed coaxially at another end of the link wheel, and a second driving chain is installed around and between the transmission wheel and a flywheel of the rear wheel axle.

2. The rear-pedaling standing type bicycle structure of claim 1, wherein the left and right pedals have a longitudinal slide passage disposed at the bottom of the left and right pedals.

3. The rear-pedaling standing type bicycle structure of claim 1, wherein a left crank and a right crank of the driving means at an end away from the shaft separately include a driving member precisely slid in a longitudinal slide passage of the corresponding pedals.

4. The rear-pedaling standing type bicycle structure of claim 1, wherein the front ends of the left and right pedals are pivotally coupled to both lateral sides of the front end of the bicycle frame respectively by a pivot.

5. The rear-pedaling standing type bicycle structure of claim 1, wherein the link wheel is installed below the first chain and driven by the external side of the first chain.

6. The rear-pedaling standing type bicycle structure of claim 1, wherein the link wheel is installed above the first chain and driven by the external side of the first chain.

* * * * *